United States Patent Office 3,244,724
Patented Apr. 5, 1966

3,244,724
SULFOALKYLATED IMIDAZOLINES
Andrew T. Guttmann, Chicago, Ill., assignor to Armour and Company, Chicago, Ill., a corporation of Delaware
No Drawing. Filed Jan. 25, 1961, Ser. No. 84,768
6 Claims. (Cl. 260—309.6)

This invention relates to the treatment of imidazolines in the preparation of sulfobetaines.

An object of the present invention is to provide a fast and direct process for the production of sulfobetaines from imidazolines. More specifically, it is an object of this invention to provide a rapid and highly effective method for preparing sulfobetaines capable of effective use as detergent-compatible fabric-softening agents. A further object is to provide compounds which not only have outstanding properties as fabric-softening agents but which are also compatible with conventional anionic and non-ionic detergents, and to provide a process for preparing such agents. Other objects will appear as the specification proceeds.

It has been found that sulfobetaines which are compatible with detergents and which have the desired fabric-softening properties may be effectively produced, under controlled conditions, by treating 1,2-dialkyl-substituted imidazolines or an alkylene-1-bis (2-alkylimidazoline) with propane sultone. The imidazoline starting materials are represented by the following general formulas (1) 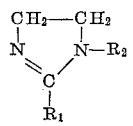

(2) 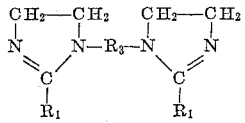

where $R_1$ is an alkyl group having a length averaging from 9 to 19 carbon atoms. $R_2$ is also an alkyl chain and may have a hydroxy or amido acid group. $R_3$ is an alkylene group—$(CH_2)_x$—where $x$ ranges from 2 to 4. It is found that where the $R_1$ group has an average chain length of 9 or more carbon atoms the ultimate sulfobetaine has substantial fabric-softening properties and that where the length averages between 15 to 19 carbon atoms the end product of the subsequent sulfoalkylation exhibits excellent fabric-softening characteristics.

The imidazoline bases of the general Formula 1 which have a tertiary basic nitrogen atom and either one or two long alkyl groups are prepared by known methods involving:

(1) The reaction of one mole fatty acid, fatty acid ester, or one-third mole of a triglyceride with one mole of a suitable polyamine, such as N-alkyl ethylenediamine or N-hydroxyethyl ethylenediamine.

(2) The reaction of two moles fatty acid, fatty acid ester, or two-third moles triglyceride with one mole diethylenetriamine.

Thus, where one mole fatty acid, fatty acid ester, or one-third mole triglyceride is reacted with one mole N-hydroxyethyl ethylenediamine, the resulting compound is 2-alkyl-1-hydroxyethylimidazoline. When two moles fatty acid, fatty acid ester, or two-thirds moles triglycerides are reacted with one mole diethylenetriamine, the resulting imidazoline will have a —$CH_2$—$CH_2$—NH—CO—R group joined to the tertiary nitrogen, and it is a 2-alkyl-1-(2'-acylamidoethyl)-imidazoline

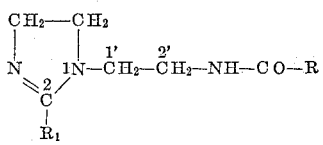

where R and $R_1$ are both alkyl groups derived from the fatty acid, ester, or glyceride used in the preparation of the imidazoline.

The bis imidazolines of the general Formula 2 are prepared by the reaction of two moles fatty acid, fatty acid ester, or two-thirds moles of a triglyceride with one mole of a polyamine having at least four amino groups separated by alkylene bridges, such as in triethylenetetramine or tetraethylenepentamine. When one mole triethylenetetramine is reacted with two moles fatty acid, fatty acid ester, or two-thirds moles fatty acid, fatty acid ester, or two-thirds moles of a triglyceride, the product is (1',2'-ethylene)-1-bis(2-alkylimidazoline) of the formula:

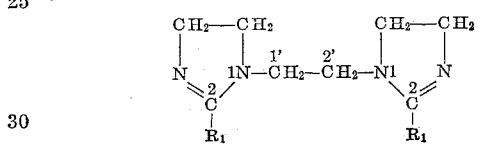

where $R_1$ is an alkyl group derived from the fatty acid, ester, or glyceride used in the preparation of the imidazoline.

The reaction between the imidazoline base and propane sultone is exothermic and is initiated simply by mixing the two reactants together. To prevent discoloration and side reactions which might result in decomposition of the ring structure, it is important that the maximum reaction temperature fall below 80 degrees C. Temperatures within the range of 30 to 70 degrees C. have been found satisfactory, the preferred temperature range being 40 to 50 degrees C.

Preferably, a solvent is used to avoid the undesirable effects of heat evolved during the exothermic reaction. The solvent should be inert with reference to both the imidazoline and the propane sultone and it should have a boiling point within a temperature range making it possible to conduct the reaction at reflux with minimum discoloration and decomposition. For reasons of economy, and to keep the reactor volume within practical limits, the solvent should dissolve the imidazoline base to such an extent that at least 50 percent by weight solution of the imidazoline is obtained at the reaction temperature. The preferred solvents have been found to be chlorinated hydrocarbons such as methylene chloride, chloroform, or ethylene dichloride, and acetone. Alcohols are less suitable as reaction solvents because at temperatures above 40 degrees C. they react with the propane sultone to form alkoxypropane sulfonic acids which in turn decompose the imidazoline base by opening the ring structure. Where alcohol has been used as solvent, the potentiometric titration curve of the reaction mixture shows a sharp inflection point at high pH, indicating the presence of a titratable acid. With an inert, non-alcohol solvent, the titration curve shows no definite inflection point as is expected from a sulfobetaine which is essentially neutral. At reaction temperatures below 40 degrees C., the formation of titratable acid in presence of alcohols as reaction solvents is so much reduced as to be negligible. However, at 40 degrees C. and below imidazolines prepared from higher saturated fatty acids such as stearic or palmitic acid, or mixtures thereof, are not sufficiently soluble in commonly used alcohols such as methanol, ethanol, or isopropanol, to form solutions of the desired high concentration. Therefore, alcohols can be used as reaction solvents only with the more soluble, low molecular weight imidazolines, at temperatures below 40 degrees C., and for the general application of the reaction the inert solvents, such as those mentioned above, are preferred.

A reaction temperature of at least 30 degrees C. and preferably 40 degrees C. or more, is necessary for complete dissolving of the imidazoline in the acetone or chlorinated hydrocarbon solvent.

The sulfopropylation is carried out most effectively by adding the propane sultone to an agitated solution of the imidazoline base at a slow rate to prevent violent refluxing of the solvent. Generally, the reactivity of the imidazoline base decreases with increasing size of the $R_2$ and $R_1$ groups and the less reactive the base the faster the propane sultone can be added. The reaction is completed by heating the reaction mixture to a temperature within the limits set out above for a period not appreciably exceeding one hour. When the reaction is finished, an aqueous suspension or solution of the product should be either neutral or slightly acidic. The sulfobetaine reaction product is obtained substantially pure by evaporating the solvent from the reaction mixture.

In commercial practice it is often desirable to obtain the sulfobetaine in alcohol solution. In such a case, if for reasons explained above the sulfopropylation cannot be carried out in an alcohol solvent, the reaction may be carried out in a low boiling inert solvent (methylene chloride, boiling point 40 degrees C.) and, after completion of the reaction, the inert solvent may be distilled out with simultaneous addition of an alcohol which boils considerably higher than the reaction solvent (ethanol, boiling point 78 degrees C.). The inert solvent is thus replaced by alcohol without the production of, and the handling problems in connection with, a solid residue. The sulfobetaine reaction product is stable in alcoholic solutions or suspensions.

Sulfobetaines of exceptional fabric-softening properties may be synthesized as described above by reacting with propane sultone an imidazoline base prepared from diethylenetriamine and a fatty acid, fatty acid ester, or triglyceride. The resulting product is a 2-alkyl-1-(2'-acylamidoethyl) - 1 - sulfopropylimidazolinium sulfobetaine, and has the general formula:

$$\begin{array}{c} CH_2\!-\!CH_2\ CH_2\!-\!CH_2\!-\!NH\!-\!CO\!-\!R \\ | \quad 1'| \quad 2' \\ N\!\diagdown_{2}\!/^{(+)}\!N \\ \diagdown C \diagup \!\!\!\diagdown\! CH_2\!-\!CH_2\!-\!CH_2\!-\!SO_3^{(-)} \\ | \\ R_1 \end{array}$$

where $R_1$ and R are both alkyl groups having a length of at least 9 carbon atoms and preferably 15 to 17 carbon atoms. Such a sulfobetaine of the zwitterion type is highly compatible with anionic and non-anionic detergents and, therefore, may be added directly to the wash water in the washing of textiles, eliminating any second fabric-softening treatment during the rinsing cycle. As is well known, ordinary cationic softeners are incompatible with anionic detergents and, as a result, can be used only in a separate rinsing cycle.

A similarly outstanding fabric softner is obtained by reacting with propane sultone a bis-imidazoline prepared from triethylenetetramine and a fatty acid, ester, or triglyceride. The resulting product is a (1',2'-ethylene)-1-bis (2-alkyl-1-sulfopropylimidazolinum) sulfobetaine $$\begin{array}{c} CH_2\!-\!CH_2 \qquad\qquad CH_2\!-\!CH_2 \\ | \quad | \quad 1' \quad 2' \quad | \quad | \\ N\diagdown_{2}\!/^{(+)}\!1N\!-\!CH_2\!-\!CH_2\!-\!N1\diagdown\,/^{(+)}\!\diagdown_{2}\!N \\ \diagdown C\diagup \ (CH_2)_3SO_3^- \quad \diagup C \\ | \qquad\qquad -SO_3(CH_2)_3 \qquad | \\ R_1 \qquad\qquad\qquad\qquad\qquad R_1 \end{array}$$

where $R_1$ are again alkyl groups having a length of at least 9 carbon atoms and preferably 15 to 17 carbon atoms.

Reference may be had to the following illustrative examples for a fuller disclosure of the present invention:

Example I

There is no absolute or mechanical test procedure for determining whether or not a compound imparts "softness" or "fluffiness" to a piece of fabric and, therefore, such determinations are based on the tactile judgments and conclusions of a panel of testers. While the results are based on subjective evaluations, wide use of the same testing procedures throughout the industry shows them to be reproducible and, with a large enough panel of judges, entirely significant and valid.

The test was conducted with a typical household automatic washer of 18 gallon capacity. The machine was filled with a 0.08 percent solution of the sulfobetaine to be tested as a fabric softner and a dummy load of clean hand towels weighing 6 pounds were placed in the machine. In addition to this dummy load, a series of desized and prescoured terry cloth test pieces were also placed in the machine. The entire load, including the test pieces, were put through the conventional suds and rinse cycle, followed by drying in a commercial home electric dryer. No other detergents or additives were used.

The above procedure was repeated three times. As a control, a load of test pieces and towels was treated in the same manner using a typical household detergent instead of the sulfobetaine fabric softener under evaluation. After three treatments, the test pieces were judged by a group of 10 to 20 people selected from the laboratory personnel and their softness or fluffiness was ranked against that of the control pieces washed with the typical household detergent. The softness of each of the treated test pieces was classified as "none," "just noticeable," "good," or "execellent."

Following the above procedure, a 2-alkyl-1-(2'-acylamidoethyl)-1-sulfopropylimidazolinum sulfobetaine $$\begin{array}{c} CH_2\!-\!CH_2\ CH_2\!-\!CH_2\!-\!CH_2\!-\!SO_3^- \\ | \quad | \\ N\diagdown^{(+)}\!/N \\ \diagdown C\diagup\ \diagdown C_2H_4\!-\!NH\!-\!CO\!-\!R \\ | \\ R_1 \end{array}$$

having an average $R_1$ and R chain length of 15–17 carbon atoms each, was rated "excellent" in its fabric softening properties. This sulfobetaine was prepared from an imidazoline having the structure $$\begin{array}{c} CH_2\!-\!CH_2 \\ | \quad | \\ N\diagdown\ \ \ /N\!-\!C_2H_4\!-\!NH\!-\!CO\!-\!R \\ \diagdown C\diagup \\ | \\ R_1 \end{array}$$

which in turn was synthesized from diethylenetriamine and a mixture of fatty acids based on partly hydrogenated tallow, composed of approximately equal parts of stearic, palmitic and oleic acids and having an iodine number of 31.1 The imidazoline had an equivalent weight of 601, and an amount of unsaturation in the alkyl groups corresponding to the iodine number of the original fatty acids.

301 g. of this imidazoline were melted and mixed with 270 g. methylene chloride. To this solution, heated to 45 degrees C., in a flask equipped with a reflux condenser, agitator, addition funnel, and thermometer, there was added 62 g. of propane sultone. During addition, the temperature rose, and the mixture refluxed gently at 48 to 50 degrees C. After addition, the reaction mixture was kept at 50 degrees C. for one one-half hour. Then part of the methylene chloride was distilled out, 130 g. ethanol was added, and the distillation was continued until all methylene chloride was removed. The residue was a very light-colored, free flowing, viscous slurry containing 74 percent solids. It was dispersible in water, the pH of the aqueous dispersion being 3.5 Only traces of titratable material were present.

*Example II*

A sulfobetaine was prepared according to Example I execpt that the imidazoline base was made from coconut oil fatty acids (rather than tallow fatty acids) and diethylenetriamine. The resulting sulfobetaine had the same structure as that given in Example I except that length of the $R_1$ and R groups averaged 11 carbon atoms.

Following the same test procedure for fabric softness as set forth in Example II, the softening ability of this sulfobetaine was judged "noticeable" to "good."

*Example III*

The compound of Example I was retested under the same conditions and at 0.08 percent conentration, but in the presence of 0.01 percent sodium dodecylbenzenesulfonate, a typical anionic detergent. The performance rating for fabric softening by this sulfobetaine was again rated as "excellent."

*Example IV*

A 1 - hydroxyethyl - 2 - alkylimidazoline with the alkyl group having an average carbon chain length of 16 to 18 atoms was prepared from a commercial mixture of stearic and palmitic acid and hydroxyethylethylenediamine. The product had an equivalent weight of 307.

307 g. of the imidazoline was melted and mixed with 200 g. acetone to form an almost clear solution. To this solution, heated to 50 degrees C., and using the same equipment as set forth in Example I, was added 124 g. propane sultone at such a rate that the heat of reaction kept the agitated mixture at moderate reflux without external heating. After the addition, when the exothermic reaction had subsided, the reaction mixture was heated under reflux at 60 to 65 degrees C. for one hour. The acetone was then removed under vacuum. The residue was 431 g. of a light yellow soft solid, melting with decomposition at above 150 degrees C., completely soluble in water. The pH of an aqueous solution was 4. Potentiometric titration in isopropanol, with 0.1 N alcoholic KOH did not reveal any significant amount of titratable material.

The performance rating for fabric softening by this compound, tested and evaluated as set forth in Example I, was deemed "good."

*Example V*

100 g. of 2-heptadecyl-1-(2'-stearoylamidoethyl) imidazoline, prepared from two moles stearic acid and one mole diethylenetriamine, was melted and mixed with 140 g. methylene chloride. To this solution, 20.2 g. propane sultone was added at 45 degrees C. in the manner described in Example I. After one hour at 50 degrees C., the solvent was removed by evaporation. The resulting 2 - heptadecyl-1-(2'-stearoylamidoethyl)-1-sulfopropylimidazolinium sulfobetaine was recrystallized from 400 ml. hot ethanol, whereupon 110 g. of a white powder was obtained which was dispersible in water. Potentiometric titration revealed the absence of any titratable acidic or basic material. Melting point: 121–123 degrees C.

*Example VI*

A bis imidazoline having the structure

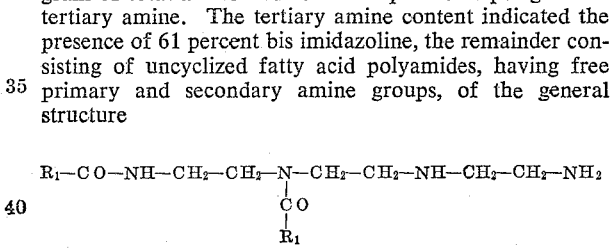

where the length of the $R_1$ alkyl groups averages from 15 to 17 carbon atoms, was prepared from triethylenetetramine and a commercial mixture of stearic and palmitic acids as follows:

268 g. (one mole) of the fatty acid mixture having an average equivalent weight of 268 was melted in a flask equipped with a stirrer, thermometer, reflux condenser, nitrogen inlet, and a Stark and Dean trap for water separation, and mixed with 35 g. xylene. Then, 73 g. triethylenetetramine (0.5 mole) was added with agitation and the mixture was heated under reflux with nitrogen being bubbled through to prevent air-oxidation and discoloration. The reaction was continued for approximately four hours until all the water of reaction had separated in the trap, and the reflux temperature increased from approximately 155 degrees C. to 210 degrees C. The xylene was then distilled out under vacuum. The light yellow reaction product solidified below 50 degrees C. It weighed 312 g., contained 3.20 milliequivalents per gram of total amine and 2.0 milliequivalents per gram of tertiary amine. The tertiary amine content indicated the presence of 61 percent bis imidazoline, the remainder consisting of uncyclized fatty acid polyamides, having free primary and secondary amine groups, of the general structure $$R_1-CO-NH-CH_2-CH_2-N-CH_2-CH_2-NH-CH_2-CH_2-NH_2$$
$$|$$
$$CO$$
$$|$$
$$R_1$$

and some unreacted triethylenetetramine. For the purpose of manufacturing a fabric softener, it was found unnecessary to separate the pure imidazoline from the reaction mixture and the crude product was reacted with an equivalent amount of propane sultone based on the total amine content of the imidazoline base. Thus, 300 g. of the base containing 0.96 equivalent of total amine were melted and mixed with 300 g. methylene chloride. To this solution, heated to 45 degrees C., there was added 117 g. of propane sultone in the same manner as described in Example I. After addition, the reaction mixture was kept at 50 degrees C. for one-half hour. The methylene chloride was then removed by evaporation under vacuum. The residue was 417 g. of a yellow solid easily dispersible in water. The pH of the aqueous dispersion was 4.5. Potentiometric titration in isopropanol with 0.1 N alcoholic KOH showed the presence of 0.85 milliequivalent per gram of titratable weak acid. The approximate composition of the reaction product was 60 to 62 percent of (1',2' - ethylene) - 1 - bis(2-alkyl-1-sulfopropylimidazolinium) sulfobetaine, and 38 to 40 percent of sulfopropylated polyamides, derived from the uncyclized material mentioned above, which are titratable as weak acids.

The performance rating for fabric softening by this product, tested and evaluated as set forth in Example I, was deemed "excellent."

While the process and product of the present invention have been set forth in considerable detail for purposes of illustration, it will be understood by those skilled in the art that many of these details may be varied without departing from the spirit and scope of the invention.

I claim:
1. An amphoteric fabric softening agent of the formula

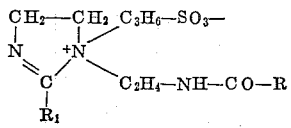

wherein $R_1$ and R are alkyl of 9 to 19 carbon atoms.

2. The product of claim 1 in which said $R_1$ and R are alkyl of 15 to 19 carbon atoms.

3. An amphoteric fabric softening agent consisting essentially of 2-alkyl-1-hydroxyalkyl-1-sulfopropylimidazolinium sulfobetaine wherein the alkyl radicals average 9 to 19 carbon atoms.

4. An amphoteric fabric softening agent of the formula

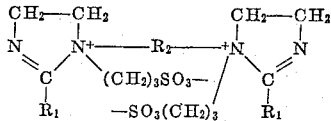

wherein $R_1$ is alkyl of 9 to 19 carbon atoms, and $R_2$ is alkylene of 2 to 4 carbon atoms.

5. The product of claim 4 in which said $R_2$ is ethylene.
6. The product of claim 4 in which $R_1$ is of 15 to 17 carbon atoms.

References Cited by the Examiner
UNITED STATES PATENTS

| | | | |
|---|---|---|---|
| 2,199,780 | 5/1940 | Chwala et al. | 260—309.6 |
| 2,833,781 | 5/1958 | Haas | 260—309.6 |
| 2,985,662 | 5/1961 | Johnson et al. | 260—309.6 |

FOREIGN PATENTS

| | | |
|---|---|---|
| 748,884 | 5/1956 | Great Britain. |
| 764,340 | 12/1956 | Great Britain. |
| 795,417 | 5/1958 | Great Britain. |

OTHER REFERENCES

German application 1,018,421 Helberger et al., printed October 1957.

Lichtenberger et al.: "Bull. Soc. Chim. de France," 1948, pages 1002–12.

WALTER A. MODANCE, *Primary Examiner.*

DUVAL T. McCUTCHEN, IRVING MARCUS, JOHN D. RANDOLPH, *Examiners.*

NATALIE TROUSOF, *Assistant Examiner.*